(12) United States Patent
Carlson et al.

(10) Patent No.: US 9,181,985 B2
(45) Date of Patent: Nov. 10, 2015

(54) SHAFT COLLAR AND SHAFT COUPLING ASSEMBLIES

(71) Applicant: Ruland Manufacturing Co, Inc., Marlborough, MA (US)

(72) Inventors: Scott J. Carlson, Worcester, MA (US); William W. Hewitson, Norton, MA (US); Scott E. Brooks, Milford, MA (US); Michael J. Langley, Medway, MA (US)

(73) Assignee: Ruland Manufacturing Co., Inc., Marlborough, MA (US)

( * ) Notice: Subject to any disclaimer, the term of this patent is extended or adjusted under 35 U.S.C. 154(b) by 13 days.

(21) Appl. No.: 13/945,680

(22) Filed: Jul. 18, 2013

(65) Prior Publication Data

US 2014/0119823 A1   May 1, 2014

Related U.S. Application Data

(60) Provisional application No. 61/718,331, filed on Oct. 25, 2012.

(51) Int. Cl.
| | |
|---|---|
| *B25G 3/20* | (2006.01) |
| *F16B 2/14* | (2006.01) |
| *F16B 2/18* | (2006.01) |
| *F16B 7/04* | (2006.01) |
| *F16D 1/08* | (2006.01) |

(52) U.S. Cl.
CPC .......... *F16D 1/0864* (2013.01); *F16D 2300/08* (2013.01); *Y10T 403/7067* (2015.01)

(58) Field of Classification Search
CPC . Y10T 403/53; Y10T 403/535; Y10T 403/69; Y10T 403/645; Y10T 403/7062; Y10T 403/7067; Y10T 403/7069; Y10T 403/7075; Y10T 403/7081; Y10T 403/7084; F16D 1/0864; F16D 2300/08

USPC .......... 403/289, 290, 344, 373, 374.3, 374.4, 403/376, 379.1, 379.3

See application file for complete search history.

(56) References Cited

U.S. PATENT DOCUMENTS

| | | | | |
|---|---|---|---|---|
| 3,125,032 | A * | 3/1964 | Smith | 418/59 |
| 3,837,767 | A * | 9/1974 | Aller | 417/423.14 |
| 4,848,951 | A * | 7/1989 | Boogerman et al. | 403/24 |
| 5,006,007 | A * | 4/1991 | Fischer et al. | 403/290 |
| 5,020,224 | A * | 6/1991 | Haupt | 30/276 |
| 5,067,845 | A * | 11/1991 | Schlueter | 403/344 |
| 5,851,084 | A * | 12/1998 | Nishikawa | 403/344 |
| 6,709,540 | B1 * | 3/2004 | Oare et al. | 156/133 |
| 6,912,789 | B2 * | 7/2005 | Price, III | 30/276 |
| 7,000,905 | B1 * | 2/2006 | Lutter et al. | 254/415 |
| 7,293,763 | B2 * | 11/2007 | Lutter et al. | 254/415 |
| 7,448,821 | B2 * | 11/2008 | Meyer | 403/290 |
| 7,614,153 | B2 * | 11/2009 | Guerra | 30/276 |
| 8,464,431 | B2 * | 6/2013 | Reynolds et al. | 30/276 |
| 8,689,451 | B2 * | 4/2014 | Cigarini | 30/276 |

* cited by examiner

*Primary Examiner* — Gregory Binda
*Assistant Examiner* — Nahid Amiri
(74) *Attorney, Agent, or Firm* — Lathrop & Gage LLP

(57) ABSTRACT

A shaft collar and shaft coupling assemblies adapted for use in the food-processing and similar industries. The assemblies include a shaft collar or shaft coupling disposed within an associated multi-element shroud. The shroud provides a cover overlying the collar or coupling, eliminating exposed features that can trap food particles, thereby effecting a high level of cleanliness of food-processing equipment upon which the collar or coupling is secured, while retaining many of the advantages of a conventional collar or coupling.

19 Claims, 22 Drawing Sheets

SHAFT COLLAR AND SHAFT COUPLING ASSEMBLIES

RELATED APPLICATIONS

This application claims the benefit of priority to U.S. Provisional Patent Application Ser. No. 61/718,331, filed Oct. 25, 2012 and entitled "Shaft Collar and Shaft Coupling Assemblies" and which is incorporated herein by reference in its entirety.

BACKGROUND

The invention relates to the field of food-processing and similar industries, and more particularly relates to devices for securing to a shaft of a machine.

The food processing industry and other similar industries, require equipment and systems which often include components which are coupled to a shaft. Typically, many of those components are secured to a shaft, or two shafts are coupled to each other, by way of a conventional shaft collar or shaft coupling. Shaft collars and shaft couplings in such equipment and systems, have been particular elements affording locations for accumulating debris, as well has harboring contaminants and breeding grounds for bacteria, as well as other harmful organisms.

Particularly with respect to food processing, it is important that equipment and systems the amenable to periodic thorough cleaning and decontamination, and also be operative in an environment in which contaminants, bacteria and other harmful organisms are absent, or at least controlled to acceptable levels. Government regulation and requirements on food safety are directed to the design and performance of equipment and systems in this field.

However, despite increased government regulation and requirements on food safety in the past few decades, no shaft collars or shaft couplings are currently available for use on food processing equipment and systems, which are designed to adequately meet the food industry's unique set of requirements. The prior art "solution", albeit sub-optimal and inadequate, is the use of common collar designs produced in specialized materials—specifically FDA/USDA-approved polymers, such as acetal resin, and stainless steel alloys, typically of the 316 formulation. The main purpose for using these materials is their ability to resist the corrosion that can be caused by the chemicals used in a conventional washdown process.

The mechanical design of conventional collars, and their interface with the rotating shafts upon which they are mounted, simply does not address, except in a very general fashion, minimization of the possibility of particle entrapment and the resulting potential for bacterial growth in and around the collar.

In conventional practice, end users looking to minimize the potential of bacteria growth often settle for the disadvantages of a set screw-type collar (due to the reduced number of physical features) and seal the set screw in place with a silicon RTV or similar material once the collar is secured to a shaft. Such a configuration greatly hampers the user's ability to later adjust the collar. Moreover, it is well known that with the use of set screw collars, the shaft to which the collar is affixed is easily damaged by the set screw. In addition, the holding power of a set screw collar is considerably less than that of other types of comparable-sized collars, such as clamp collars. As a consequence of such issues with set screw collars, many users have also eliminated the set screw features completely from their design, instead relying on a press fit between the shaft and collar to maintain positioning.

Regardless of the type of collar or coupling, the prior art collars and couplings used in the food industry have a large number of exposed physical features which pose a high risk for collecting food particles and the subsequent potential for the growth of harmful bacteria that feed on the stray food particles lodged in those physical features. As a consequence, designers of food processing equipment have gone to great lengths to reduce and/or eliminate physical features of the machinery that present the possibility for food entrapment, often cordoning off as much of the overall machine as possible behind shielding in order to minimize the number of components that can possibly come into contact with the food product. Components located outside such shielding, which often include shafts and associated collars and couplings secured thereto, are subject to the strict government safety equipment regulations. Machine components within the contact area, must be cleaned frequently and thoroughly, with great expense of both labor and machine down-time, else the operator runs the risk of hefty consequences from a failed inspection by a regulatory agency. The conventional collars and couplings which are commonly used as guides, stops and couplings in such machines, often account for a significant amount of the cleaning time due to the numerous small crevices created by the screw features and clamping cuts.

Conventional modifications made to collars and couplings to decrease the likelihood of food entrapment and consequent bacteria growth, come with great sacrifices in performance characteristics. The method previously described for the use of set screw collars not only introduces the negative aspects of set screw collars (i.e., damage to shafts, lower holding power than clamp styles), but also severely inhibits the user's ability to adjust or remove the collar. While press-fit collars generally have few or no entrapment areas besides the collar/shaft or coupling/shaft interface, their holding power for both axial and radial loads are significantly lower than conventional clamp-type shaft collars and shaft couplings, and rapid or precise position adjustments are not feasible.

Improved shaft collars and shaft couplings are needed for application in equipment and systems used in the food processing and related industries, to provide improved food safety as well as more efficient operation.

SUMMARY OF THE INVENTION

Improved shaft collar assemblies and shaft coupling assemblies are disclosed herein. In such assemblies, shaft collars and shaft couplings have an integrally coupled multi-element shroud assembly. The collar and coupling assemblies are adapted for securing to a shaft of a machine. The shaft collar and shaft coupling assemblies are preferably but not necessarily metallic.

In a form, the shroud comprises two elements, an annular first shroud element which is affixed to, in some embodiments, a near-"conventional" clamp collar, or a coupling, and an annular second shroud element, where the second shroud element is adapted to be selectively coupled to the first shroud element, to fully encase the clamp collar, or coupling. In a form, the first shroud element and the second shroud element are adapted to be mutually coupled via a threaded structure. In other forms, those elements are interconnected in other fashions, such as via a snap-fit or an interference fit. The first shroud element and the second shroud element are adapted to be readily de-coupled, for example by a user, or maintenance technician, to allow access to a clamp assembly associated with the enclosed collar or coupling, so that the collar or coupling can be adjustably re-positioned or made ready for removal, with respect to the shaft upon which it is secured.

With this configuration where the collar or coupling is fully enclosed by the shroud assembly, the above-noted problems of the prior art are effectively overcome. The number of exposed physical features of the collar or coupling that can potentially trap food particles, are minimized and preferably limited to the two assembly/shaft interfaces. As a consequence, the effort and time required for maintaining of a regulation-mandated level of cleanliness, a highly time-intensive process, is substantially eased. In a preferred form, instead of using synthetic materials for the collar or coupling (as is often done in the prior art) as a compromise to ease the burden caused by regulations, or the use of press-fit collars or couplings, the use of metallic collars and couplings is now safely enabled in accord with the present invention, enabling the many advantages of metallic collars and couplings, most notably greater holding power and ease in removal and/or repositioning.

Thus, in such shaft collar and shaft coupling assemblies, the collar assembly or coupling assembly, with its collar or coupling encased by its fully enveloping multi-element shroud assembly, eliminates all possible external features of the encased collar or coupling, making washdown processes significantly faster and easier, while reducing the likelihood of bacterial growth that could ultimately contaminate the food products being processed.

In addition, such shaft collar and shaft coupling assemblies maintain many of the key features of conventional shaft collars and couplings: the ability to be easily adjusted, without damaging a shaft to which the collar or coupling is secured; relatively high load capacity; and a precision face for alignment purposes.

In a form, a collar/coupling assembly is provided for being secured to a shaft characterized by a predetermined radius R1 where the shaft extends along and is disposed about a shaft axis S.

The collar/coupling assembly includes an annular collar/coupling, a multi-element shroud assembly and a capture assembly for captively coupling the collar/coupling to an element of the shroud assembly.

The collar/coupling extends along and is disposed about a central axis, and is adapted for fixture to the shaft with the central axis being coaxial with the shaft axis. The collar/coupler is selectively adjustable to have an inner radius R with respect to the central axis where R≥R1.

The shroud assembly includes an annular first shroud element and an annular second shroud element.

The annular first shroud element is disposed about a first shroud axis, and has a first outer peripheral boundary and a first central aperture. The first central aperture has a radius greater than R1.

The second annular second shroud element is disposed about a second shroud axis, and has a second outer peripheral boundary and a second central aperture. The second central aperture has a radius greater than R1.

The capture assembly captively couples the collar/coupling to the first annular shroud element so that the central axis is coaxial with the first shroud axis.

The first shroud element and the second shroud element are adapted to be selectively joined at or near their respective outer peripheral boundaries. The so-joined structure establishes an interior volume adapted to fully enclose the clamp collar whereby the clamp axis, the first shroud axis and the second shroud axis are coaxial.

In a form, the collar/coupling is made of a relatively non-compliant metal, and the first shroud element and the second shroud element are made of a relatively compliant synthetic material.

The collar/coupling assembly is particularly useful in the food-processing and similar industries. In a preferred form, the assembly includes a metallic shaft collar/coupling disposed within an associated shroud. The shroud provides a cover overlying the collar/coupling, eliminating exposed features of the collar/coupling that can trap food particles and make maintaining a proper level of cleanliness of food-processing equipment, a time-intensive, costly process, while retaining many of the advantages of a standard metallic collar/coupling.

DETAILED DESCRIPTION OF THE EMBODIMENTS

Reference is now made to the figures wherein like parts are referred to by like numerals throughout. Referring generally to the figures, the following discussion describes a shaft collar and shaft coupling assemblies.

Shaft collars and shaft couplings are similar in many respects. Both shaft collars and shaft couplings are generally used with shafts of a machine, in which the shafts may be stationary or the shafts may be driven to rotate.

Shaft collars are typically in the general form of a generally annular element and an assembly for rigidly coupling the annular element to a shaft of a machine. Shaft couplers are often used as position-limiting "end elements" for an assembly of components supported by a shaft of a machine. In such applications, the collar is mounted onto the shaft at a desired position and anchored, or clamped, to the shaft, providing a limit to the motion of other components mounted on the shaft.

Shaft couplings are generally used to couple a first shaft to a second shaft, with one shaft being coupled to a machine and the other shaft being coupled to a load. In a typical application, one of the shafts is driven to rotate by a machine, and it is desired that the second shaft rotate with the driven shaft. Shaft couplings are often constructed to include two shaft collar-like elements which are interconnected by a rigid, or sometimes a flexible connection structure (so that in the case of a rigid connection structure, the two shafts are co-linear, and in the case of a flexible connection structure, the two shafts can be misaligned, but still rotate together).

Many types of collars may be used directly, or in variant form, in the shaft collar and shaft coupling assemblies disclosed herein, including those available from Ruland Manufacturing Co., Inc., Marlborough Mass. (www.ruland.com). Such collars and couplings include, without limitation, split-hub/split flange collars, split-hub/common flange collars, hubless collars, split collars, cam-lock collars, taper lock collars, set screw collars, combination collars/couplings, and couplings.

Figure 17:
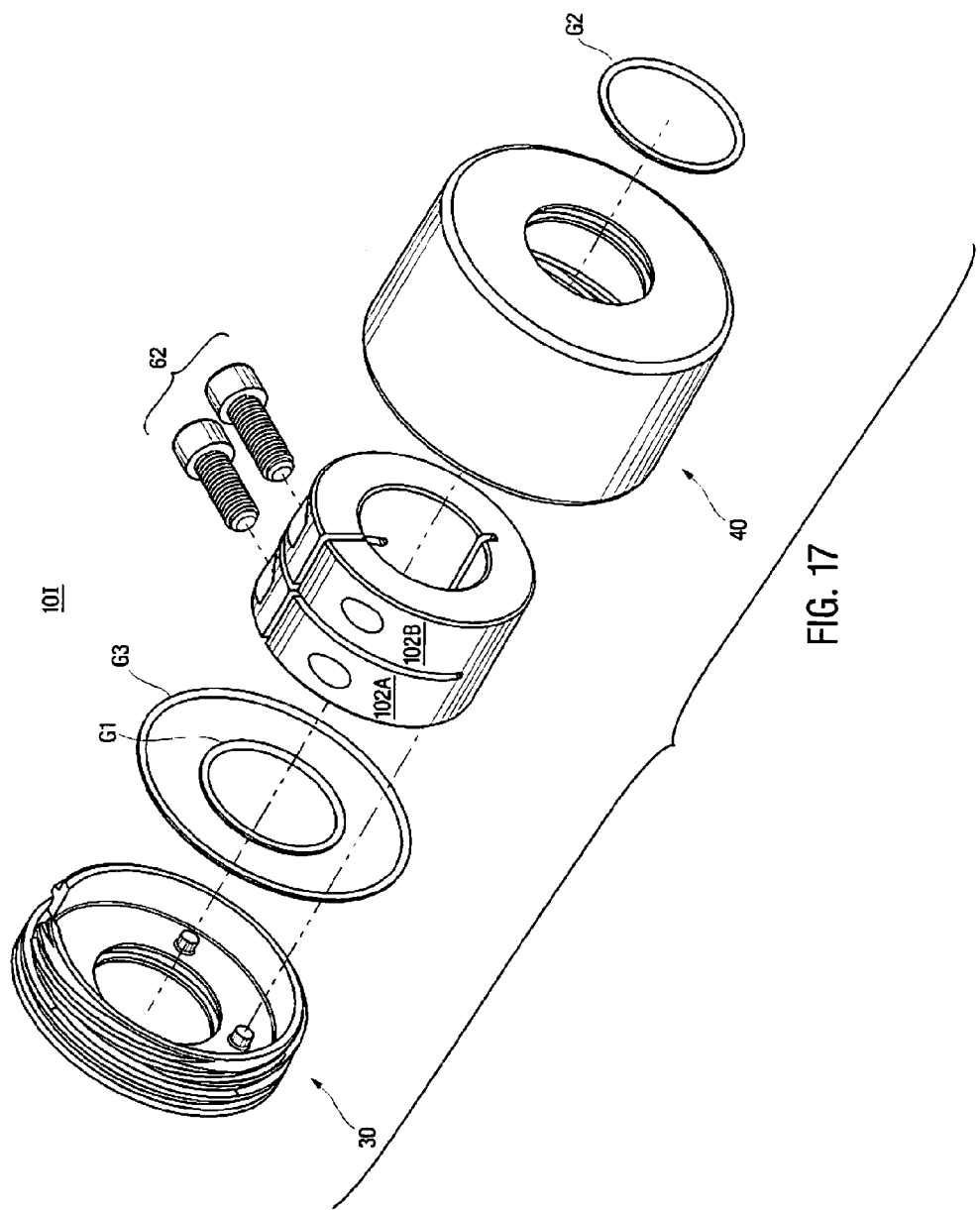
FIG. 17 shows an exploded view of a "hubless collar/short rigid coupling" embodiment of a collar/coupling assembly of the invention.
Figure 18:
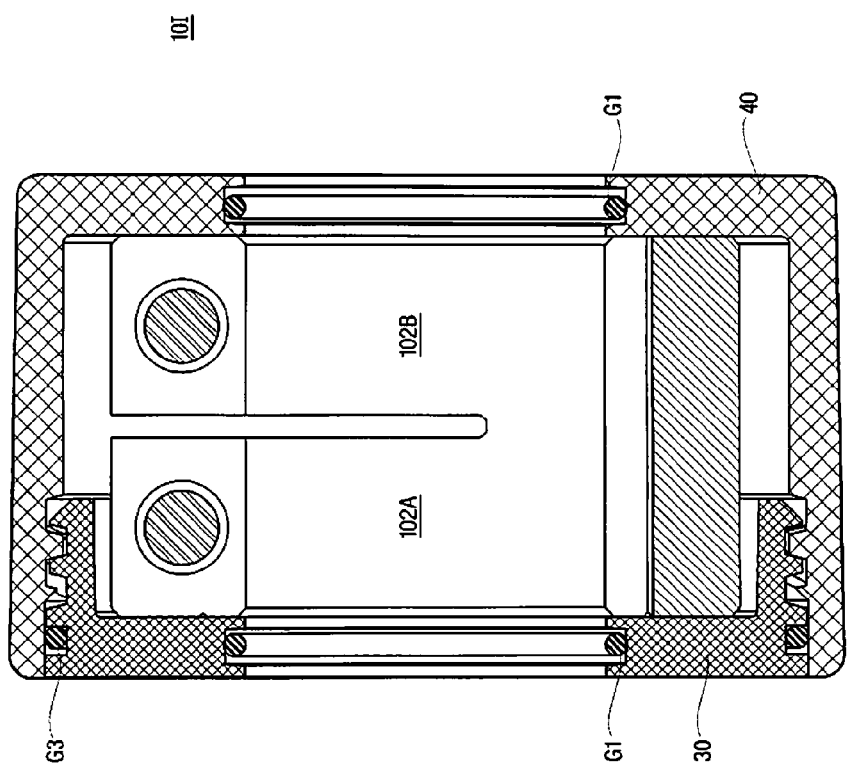
FIG. 18 shows a cross-section of the embodiment of FIG. 17.
Figure 19:
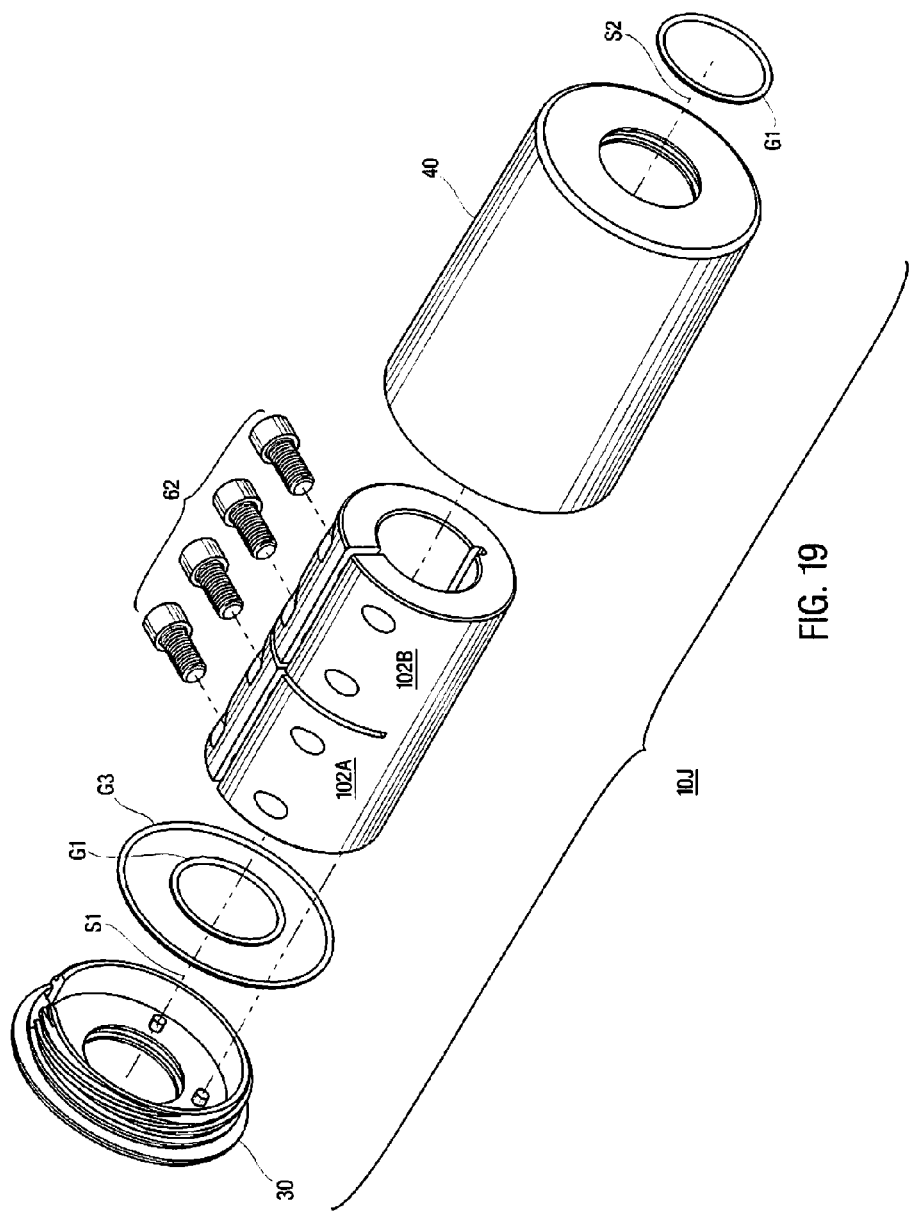
FIG. 19 shows an exploded view of a "long rigid coupling" embodiment of a coupling assembly of the invention.
Figure 20:
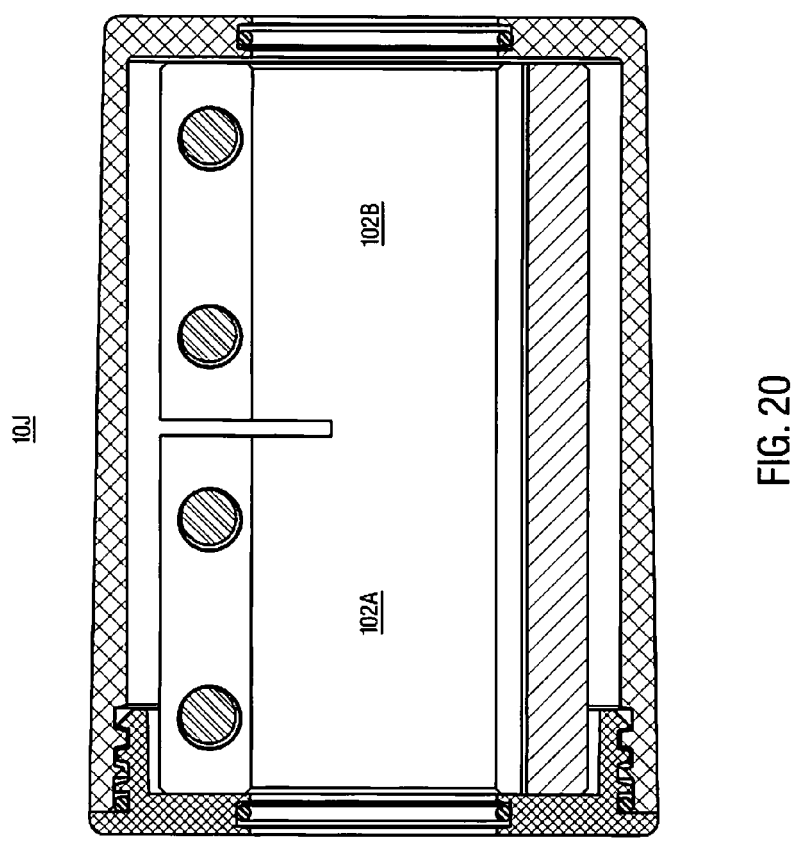
FIG. 20 shows a cross-section of the embodiment of FIG. 19.
Figure 21:
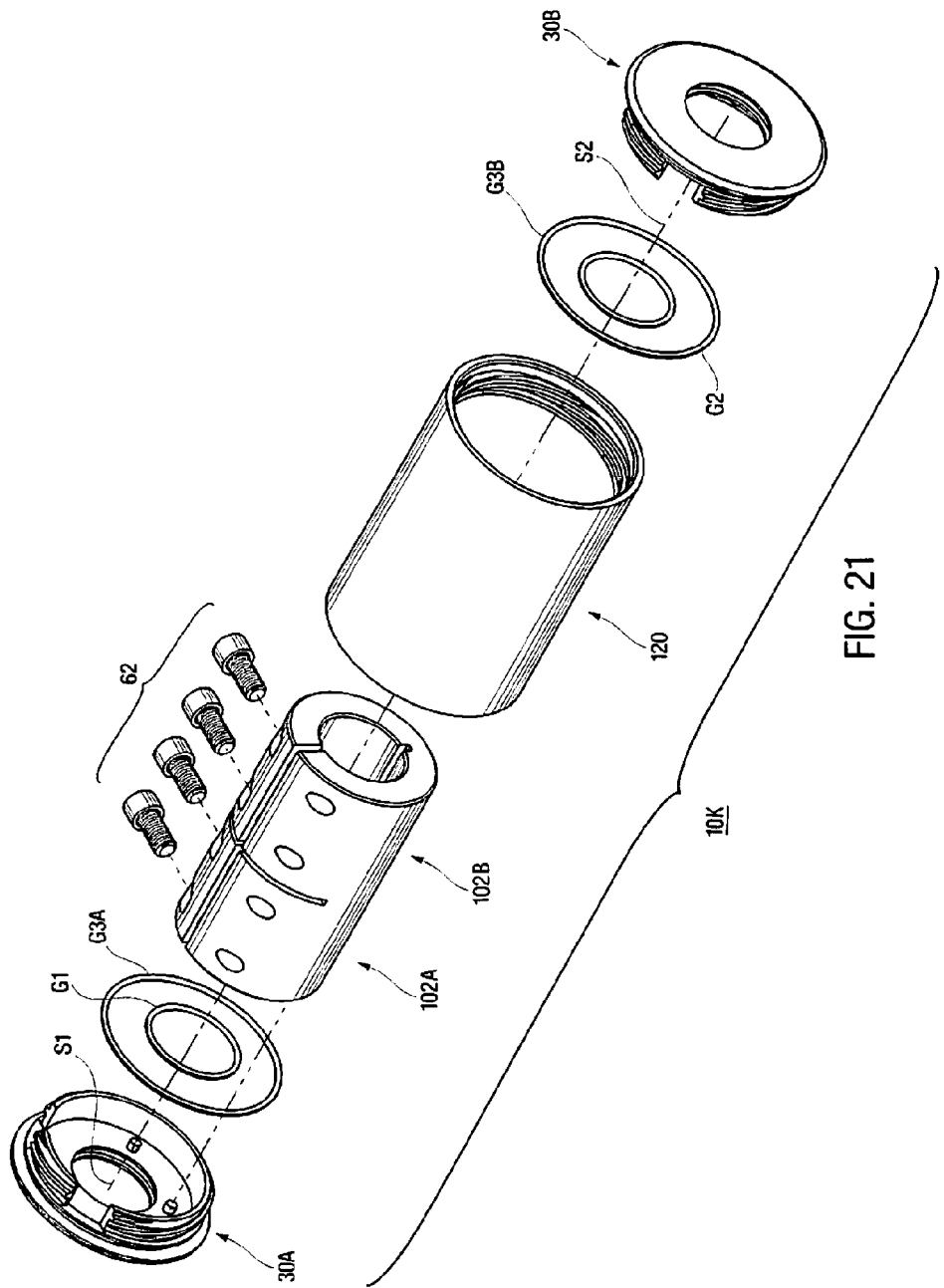
FIG. 21 shows an exploded view of an alternative "long rigid coupling" embodiment of a coupling assembly of the invention.
Figure 22:
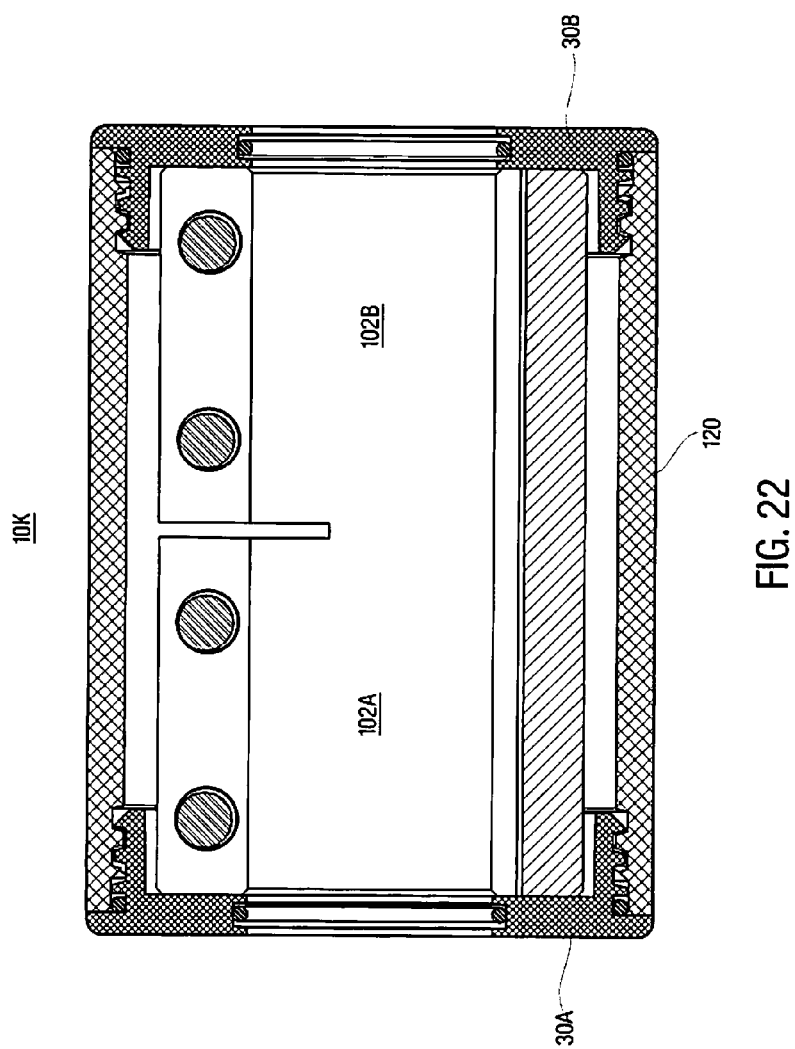
FIG. 22 shows a cross-section of the embodiment of FIG. 21.

Due to the related nature of shaft collars and shaft couplings, the various embodiments below are described in different places as "collar assemblies", "coupling assemblies" and "collar/coupling assemblies", but it should be recognized that uses for the same structure may overlap, that is, the same structure may be used as a shaft collar in a first application, or used as a shaft coupling in a second application. For example, the embodiment described in conjunction with FIGS. 17 and 18 could be used as a shaft collar in one application and as a shaft coupling in another application.

An exemplary shaft collar/coupling assembly adapted for use in the food-processing and similar industries is described in detail below. The assembly includes a shaft collar (preferably, but not necessarily metallic) disposed within an associated shroud. The shroud provides a cover overlying the collar, eliminating exposed physical features of the collar/coupling that can trap food particles. The novel collar/coupling assemblies disclosed herein, make the washdown process relatively quick and easy, as compared to time-intensive and costly process required food processing equipment and systems using prior art collars. Moreover, the novel collar/coupling assemblies disclosed herein, allow food processing equipment and systems to enjoy the advantages of a metallic clamp collar/coupling, without the compromises of the physical features of such collars.

FIGS. 1, 3, 5 and 7 show exploded views of four different embodiments, respectively, of exemplary collar assemblies 10A, 10B, 10C and 10D of the invention. FIGS. 2, 4, 6 and 8 show cross-sections of the respective embodiments 10A, 10B, 10C and 10D of FIGS. 1, 3, 5 and 7.

In FIGS. 1, 3, 5 and 7, collar assemblies 10A, 10B, 10C and 10D are adapted for coupling to a shaft having radius R1. Collar assemblies 10A, 10B, 10C and 10D each comprise a clamp collar 14 including:

a C-shaped body member 16 disposed about a central axis C, and extending in a circumferential direction between a substantially planar first collar end surface 16A and a substantially planar second collar end surface 16B, wherein the body member 16 includes a flexure region F whereby the first collar end surface 16A and the second collar end surface 16B are adapted for relatively resilient motion in a circumferential direction with respect to the central axis C, and relatively stiff motion in other directions.

The first collar end surface 16A is opposite the second collar end surface 16B and is substantially parallel thereto and separated therefrom by a gap G.

The body member 16 includes, extending between the first collar end surface 16A end the second collar end surface 16B:

a planar C-shaped first face surface 20A extending about and perpendicular to the central axis C, a planar C-shaped second face surface 20B extending about and perpendicular to the central axis C, a nominally cylindrical inner surface 20C having a radius greater than R1 and extending about and by a distance D1 in the direction of the central axis C, a nominally cylindrical outer surface 20D having a radius greater than R2 and extending about and by a distance D1 in the direction of the central axis C, where R2 is greater than R1, A clamp assembly 24 adjustably couples an end portion 24A of the body member 16 adjacent to the first collar end surface 16A to an end portion 24B of the body member 16 adjacent to the second collar end surface 16B. The clamp assembly 24 is adjustable to enable selective adjustment of the gap G whereby points on the inner surface 20C are equidistant by a distance approaching R1 from the central axis C.

The collar assemblies 10A, 10B, 10C and 10D further comprise a multi-element shroud assembly including a first shroud element 30, and a second shroud element 40.

The first shroud element 30 has a first annular face member 31 disposed about the first shroud axis S1. The first annular face member 31 defines a central circular aperture 32 disposed about axis S1, and having a radius greater than or equal to R1. The first shroud element 30 has a circular first peripheral boundary P1 disposed about axis S1 and having a radius greater than or equal to R2.

A first cylindrical shell 34 extends from the first peripheral boundary P1 of an inward facing surface of the first annular face member 31. The first cylindrical shell 34 has an inner wall 36 and an outer wall 38, both extending a distance D2 in the direction of the first shroud axis S1, where D2 is greater than or equal to D1. The outer wall 38 bears a helical thread pattern T1. The inner wall 36 is complementary in shape to the outer surface 20D of the body member 16.

The second shroud element 40 has a second annular face member 41 disposed about a second shroud axis S2. The second annular face member 41 defines a central circular aperture 42 disposed about the second shroud axis S2, and having a radius greater than or equal to R1. The second annular face member 41 has a circular second peripheral boundary P2 and having a radius greater than or equal to R2.

A second cylindrical shell 44 extends from the second peripheral boundary P2 of an inward facing surface of the second annular face member 41. The second cylindrical shell 44 has an inner wall 46 and an outer wall 48, both extending a distance D3 in the direction of the second shroud axis S2. The inner wall 46 bears a helical thread pattern T2, where T2 is complementary to T1.

A capture assembly 50A, 50B (for embodiments 10A and 10B) and 50AA and 50BB (for embodiments 10C and 10D) is adapted to captively couple the body member 16 to the first shroud element 30 and within the first cylindrical shell 34 of the first shroud element 30, whereby the first face 20A of the body member 16 is adjacent to the inner surface of the first annular face member 31 of the first shroud element 30.

In use, the capture assembly 50A, 50B (for embodiments 10A and 10B) and 50AA and 50BB (for embodiments 10C and 10D) prevents rotation of the shroud assembly (first shroud element 30 and second shroud element 40) with respect to the collar/coupling 14. As a consequence, the aperture 70 of the first cylindrical shell 34 always overlies the screw 62 of the clamp assembly 24, permitting a user, or maintenance technician, to adjust the position of the collar/coupling assembly.

In the exemplary collar assemblies, the clamp assembly 24 includes an elongated first through-hole 60A in the first end portion 24A of body member 16, and an elongated second through-hole 60B in the second end portion 24B of the body member 16.

In a preferred form, the through-holes 60A, 60B are each cylindrical, extending along a common through-axis TA transverse to central axis C. The through-hole 60A has a radius RA and bears an internal thread pattern T01, and the through-hole 60B has a radius RB which is greater than a maximum radius of the thread pattern T01.

The clamp assembly 24 further includes a screw 62, such as a cap screw, having a shoulder 62A. The screw 62, beyond the shoulder 62A, has an outer cylindrical surface having radius RA and bears a thread pattern T02, where thread pattern T02 is complementary to thread pattern T01. The shoulder 62A has a radial dimension greater than RB.

The outer cylindrical surface of screw 62 is rotationally positionable within the throughholes 60A, 60B, with the thread pattern T02 engaging the thread pattern T01 of throughhole 60A. The screw 62 is adapted so that when it is rotated in a first direction, relative motion is effected whereby the first end face 16A and second end face 16B of body member 16, move toward each other, reducing gap G. When screw 62 is rotated in a second direction opposite the first direction, relative motion is effected whereby the first end face 16A and second end face 16B of body member 16, move away from each other, increasing gap G.

In a form of the collar assemblies 10A, 10B, 10C and 10D, the first cylindrical shell 34 of the first shroud element includes an aperture 70 extending therethrough, wherein the aperture extends along and about the through axis TA. With this configuration, with the second shroud element 40 unscrewed from engagement with the first shroud element 30, the screw 62 may readily be accessed (via aperture 70), and rotated, allowing removal or re-positioning, of the collar assembly, as desired.

In use of a collar assembly of the invention as illustrated in FIGS. 1-8, the body member 16 of the collar 14 is affixed, i.e., captively coupled, to the interior of the first shroud element 30 and those then-joined elements are mounted onto a desired rotatable shaft having radius R1. When in a desired position on that shaft, the screw 62 is accessed by a user through aperture 70 in the first shroud element 30, and the screw 62 is rotated to deform the body member 16 of the clamp collar 14 so that the inner surface 20C approaches the radius R1.

For the embodiments 10A and 10B of FIGS. 1-4, when inner surface 20C reaches a radius R1+2r (where r equals the thickness of elements 82 and 82A described below), clamp collar 14, and the joined shroud element 30, are robustly clamped to the shaft.

For the embodiments 10C and 10BD of FIGS. 5-8, when inner surface 20C reaches a radius R1, clamp collar 14 and the joined shroud element 30, are robustly clamped to the shaft.

Then, the second shroud element 40 is mounted to the shaft, and positioned adjacent to the joined clamp 14/shroud element 30. The second shroud element 40 is then rotated, engaging the thread pattern of the outer wall 34 of the first shroud element 30 with the thread pattern of the inner wall 46 of the second shroud element 40. The latter step effects a complete enclosure of the clamp collar 14 by the joined first shroud element 30 and second shroud element 40.

In some forms, particularly but not necessarily, where the first shroud element 30 and second shroud element 40 are relatively stiff, gaskets are deployed in the clamp assembly to effect a good seal about the clamp collar 14, and to eliminate pockets where food particles can accumulate and promote bacterial growth. In those forms, (i) a resilient gasket G1 is deployed in shroud element 30 in a circular groove extending radially from the boundary of central aperture 32, (ii) a resilient gasket G2 is deployed in shroud element 40 in a circular groove extending radially from the boundary of central aperture 42, and (iii) a resilient gasket G3 is deployed at a junction of first shroud element 30 and second shroud element 40, near the periphery P1 of shroud element 30.

In other forms, the first shroud element 30 and second shroud element 40 are relatively flexible and/or resilient, and upon tightening of the connection between the elements 30 and 40, those elements deform against the relatively rigid metallic clamp, establishing a good seal and eliminating pockets where food particles can accumulate and promote bacterial growth.

Figure 1:
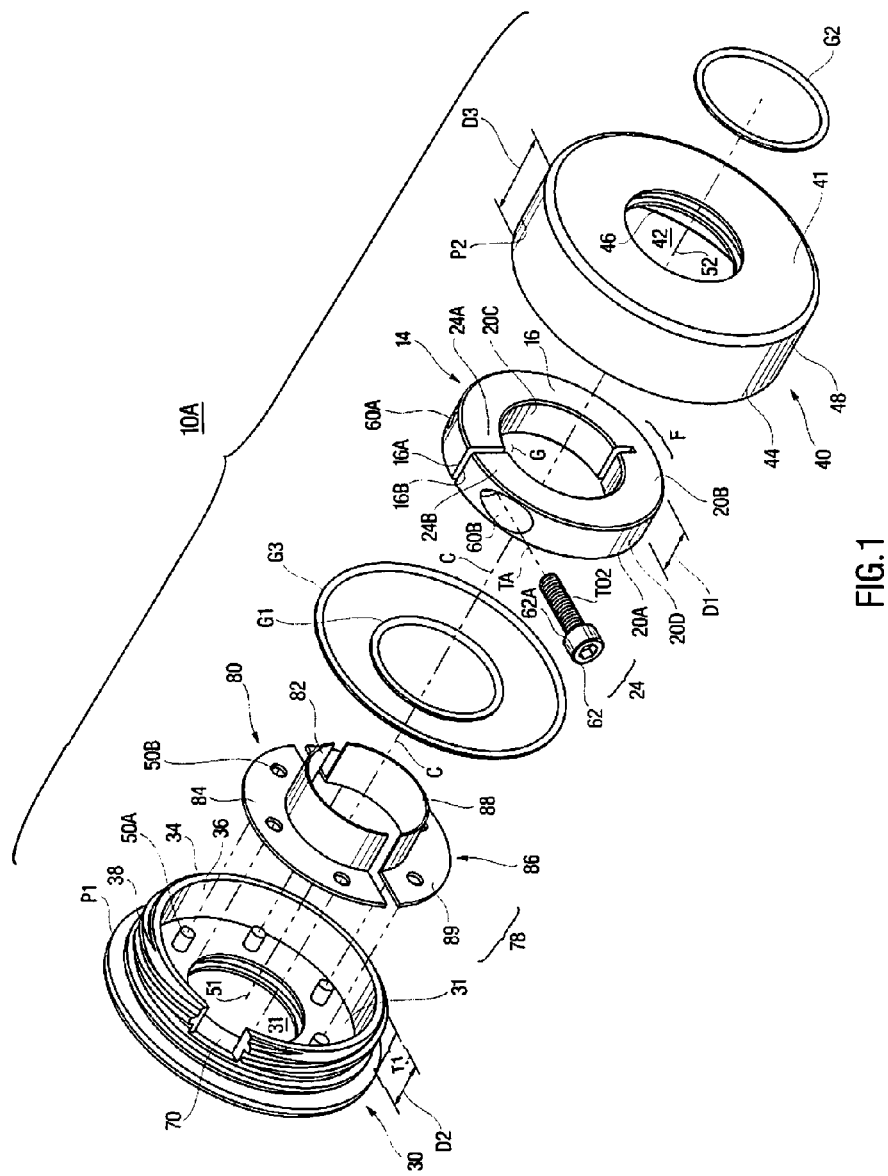
FIG. 1 shows an exploded view of a "split-hub/split flange" embodiment of a collar assembly of the invention.
Figure 2:
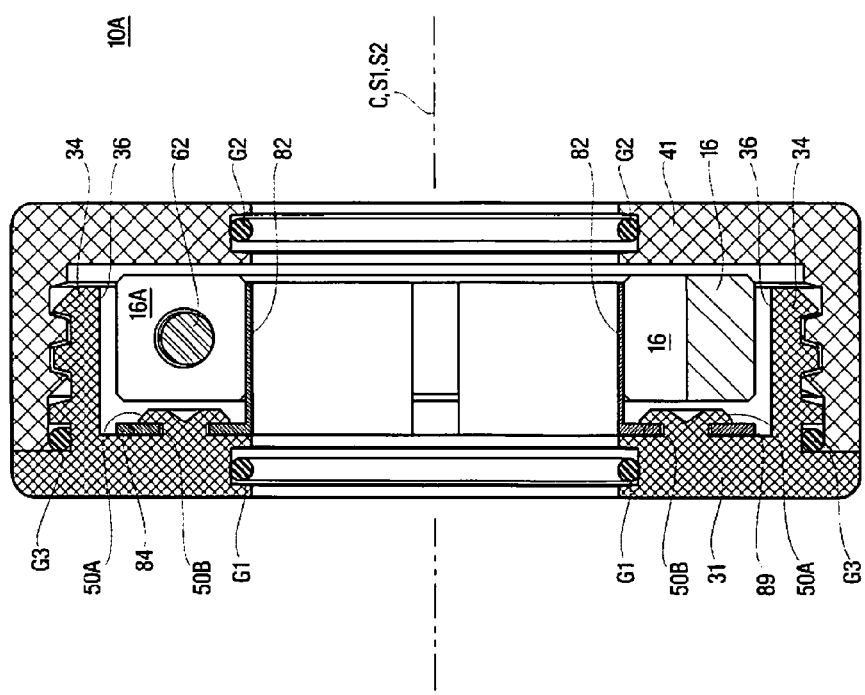
FIG. 2 shows a cross-section of the embodiment of FIG. 1.
Figure 3:
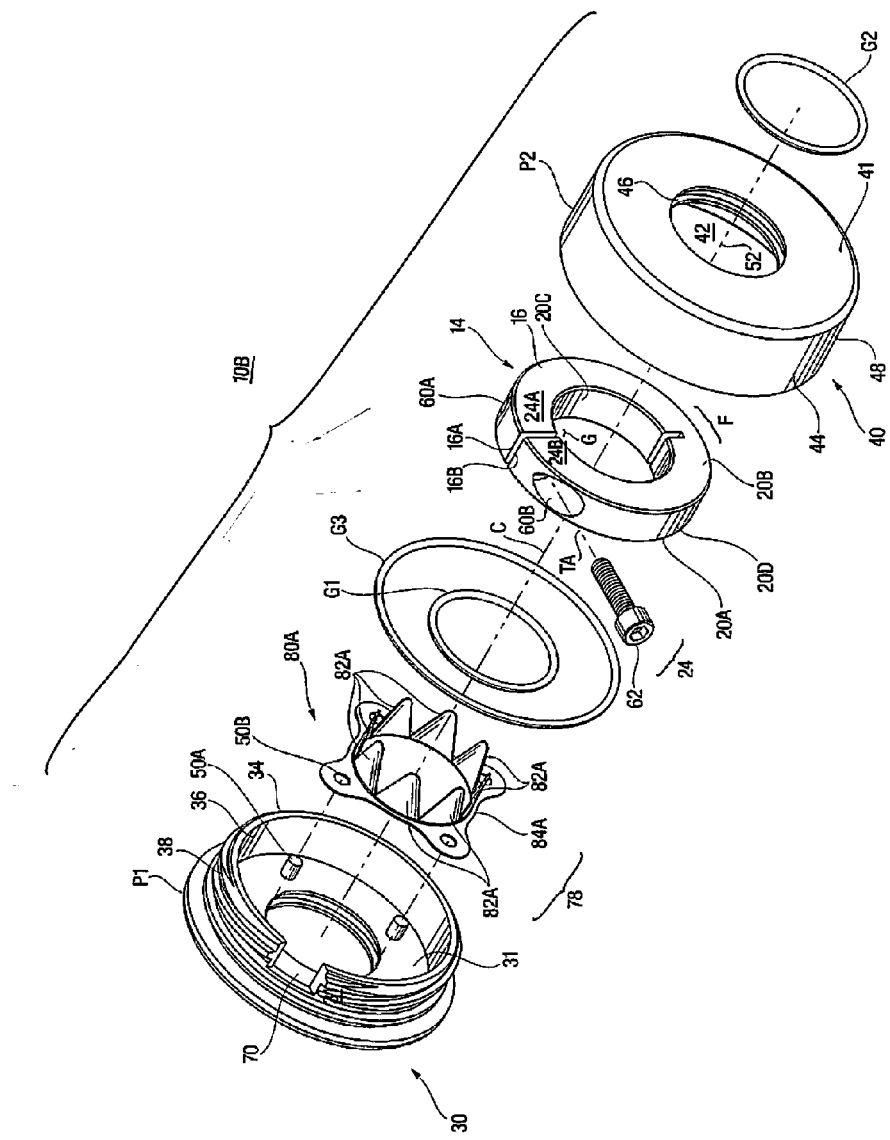
FIG. 3 shows an exploded view of a "split-hub/common flange" embodiment of a collar assembly of the invention.
Figure 4:
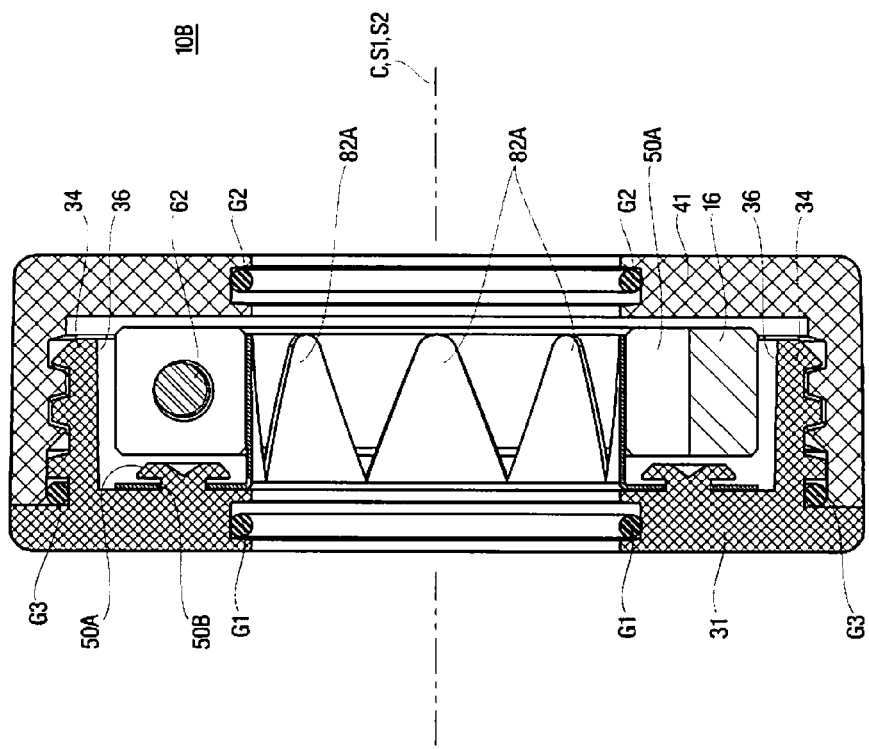
FIG. 4 shows a cross-section of the embodiment of FIG. 3.

In the "split hub/split flange" embodiment 10A of FIGS. 1-2, and the "split-hub/common flange" embodiment 10B of FIGS. 3-4, the collar assembly 10A and collar assembly 10B includes a metallic sheet hub element 78 affixed to the first shroud element 30.

In the form of FIG. 1, the sheet hub element 78 includes a "split hub" including first hub element 80 and a second hub element 86. In other split hub embodiments, there can be more than two split hub elements, for example, m hub elements where m≥1.

The first hub element 80 has a first cylindrical shell section 82 extending a distance D1 in the direction of, and less than 180° about, the axis S1 from a first end to a second end, and has a radius R1 with respect to the axis S1. The first hub element 80 includes at the first end thereof, a first flange 84 extending radially therefrom with respect to axis S1. The first flange 82 is fixedly attached to an inner surface of the first annular face member 31 whereby axis SI is coaxial with the central axis C.

The second hub element 86 has a second cylindrical shell section 88 extending a distance D1 in the direction of, and less than 180° about, the axis S1 from a first end to a second end, and has a radius R1 with respect to the axis S1. The second hub element 86 includes at the first end thereof, a second flange 89 extending radially therefrom with respect to axis S1. The second flange 49 is fixedly attached to an inner surface of the first annular face member whereby axis S1 is coaxial with the central axis C.

The non-contiguous flanges 82 and 88 form the basis for the "split hub" designation, and the non-contiguous flanges 84 and 89 form the basis for the "split flange" designation.

In the "split hub/common flange" embodiment 10B of FIGS. 3-4, the sheet element 78 includes a single hub element 80A. The hub element 80A has a first cylindrical shell section 82A (comprising a number of circumferentially non-contiguous "pointed" subsections) extending a distance D1 in the direction of the axis S1 from a first end to a second end, and has a radius R1 with respect to the axis S1. The first hub element 80A includes at the first end thereof, a single flange 84A extending radially therefrom with respect to axis S1. The flange 84A is fixedly attached to an inner surface of the first annular face member 31 whereby axis S1 is coaxial with the central axis C.

The eight circumferentially non-contiguous flanges 82A form the basis for the "split hub" designation, and the single flange 84A from which sections 82A extend, forms the basis for the "common flange" designation.

In the "hubless" embodiments 10C and 10D of FIGS. 5-8, the collar assembly 10C includes a coupling assembly including n elongated extension members 50AA extending from the first annular face member 31, and n elongated apertures 50BB extending into and through the body member 16, where n is greater than or equal to 1. In the particular form of FIGS. 5-8, n=2.

The n elongated extension members 50AA each extend with a monotonically decreasing cross-section, by a distance H from the inward facing surface of the first annular face member 31 along respective associated axes parallel to the central axis C. The n elongated extension members 50AA each extend to a distal tip thereof. The respective axes of the extension members 50AA are in a predetermined pattern P transverse to the central axis C.

The n elongated apertures 50BB extend with a monotonically decreasing cross-section, into and through body member 16 from the first face surface 20A. Each of the apertures 50BB is adapted to receive a correspondingly positioned one of the extension members 50AA. In a form, but not all forms, at least one of the distal tips of the elongated extension members 50AA extends beyond the body member 16 and is deformable to establish a capture portion with a cross-section transverse to the direction of the central axis C having a greater area than a cross-section of its associated aperture at the second face surface of the body member 16. In other embodiments, the combination of the first shroud element and the second shroud element effect the captive coupling of the collar to one of the shroud elements.

The illustrated coupling assembly 10C also includes a tab element TAB, which extends radially inward from the inner wall 36 of the cylindrical shell 34. When the clamp collar 14 is fixedly attached to the first shroud elements, the tab element TAB is disposed within the gap G between first face surface 16A and second face surface 16B. The thickness of the tab element TAB in the circumferential direction is sufficiently small that the tab element TAB fits between end surfaces 16A and 16B when the body member is deformed (by the clamping assembly 24) such that inner surface 20C is cylindrical with a radius R1.

In a form of the collar assemblies 10A, 10B, 10C and 10D, the body member 16 is metallic and the first shroud element 30 and the second shroud element 40 are made of a deformable synthetic material, for example plastic.

Figure 5:
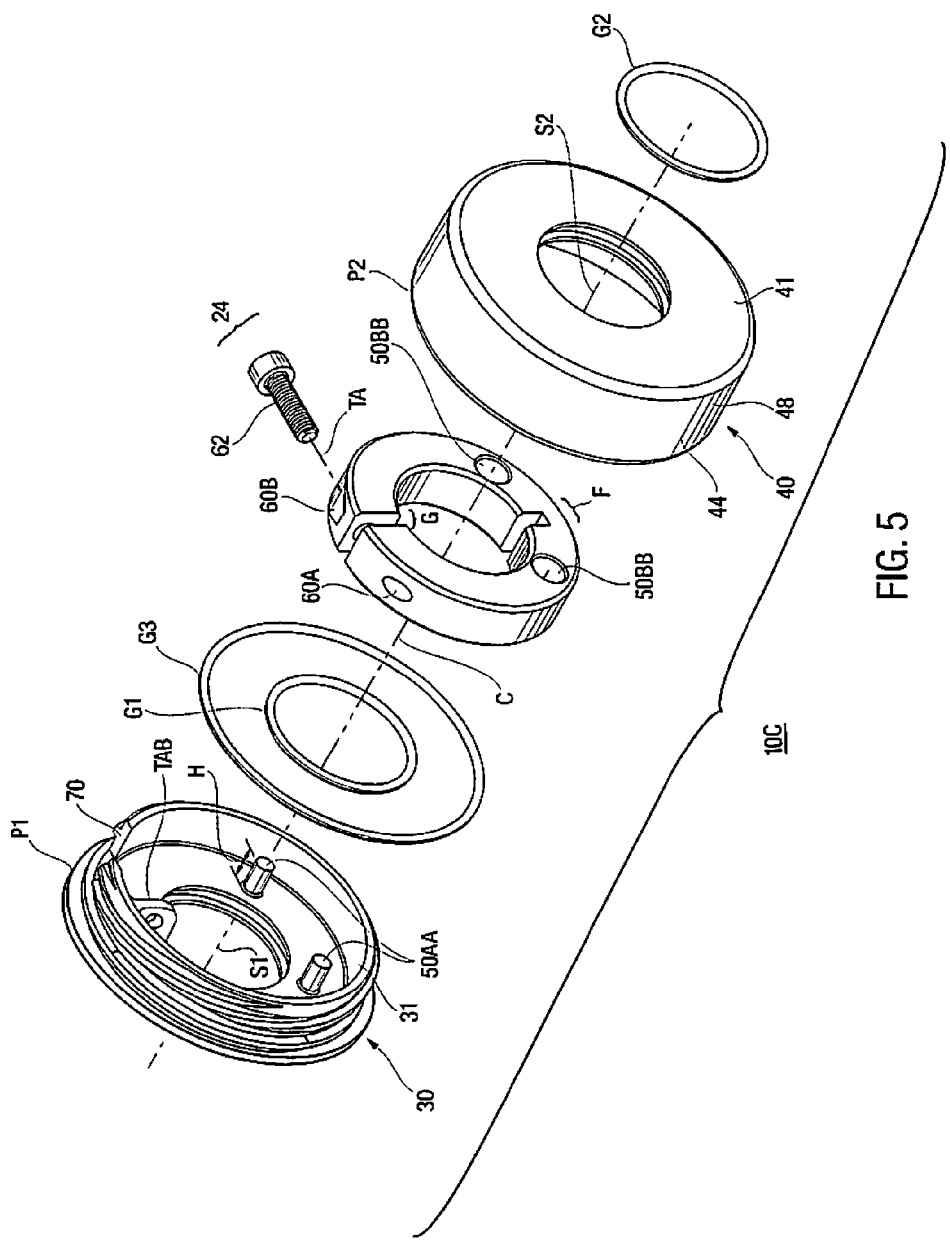
FIG. 5 shows an exploded view of a "hubless" embodiment of a collar assembly of the invention.
Figure 6:
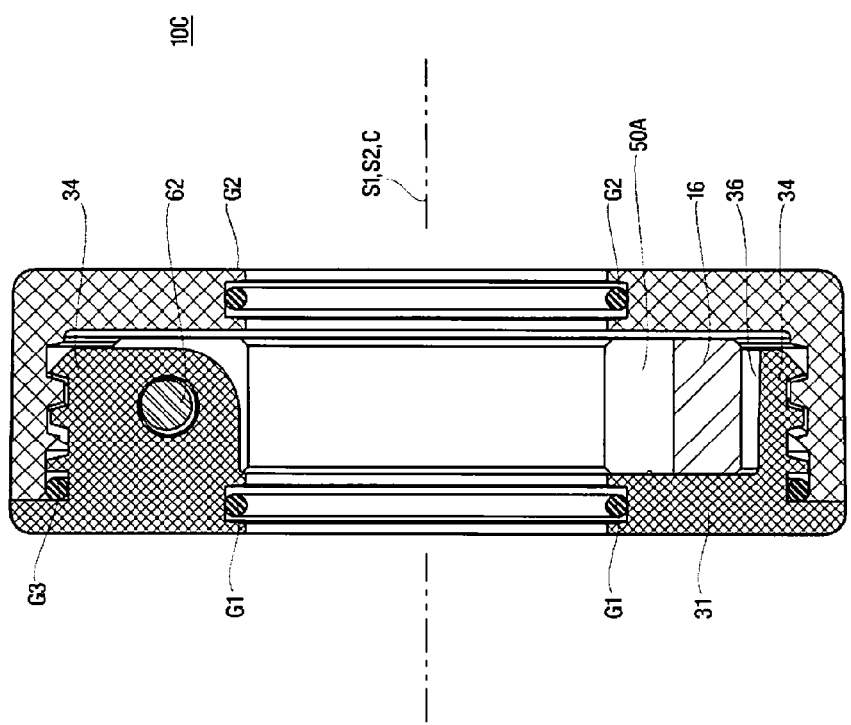
FIG. 6 shows a cross-section of the embodiment of FIG. 5.
Figure 7:
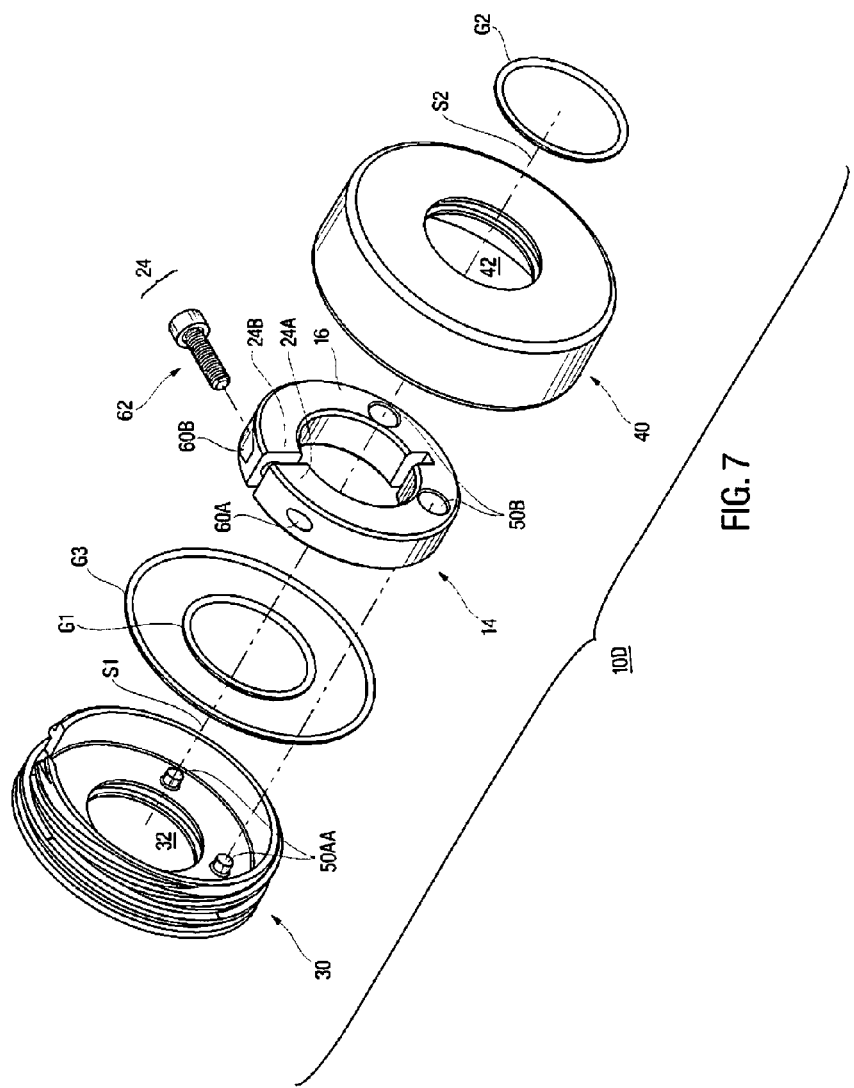
FIG. 7 shows an exploded view of an alternative "hubless" embodiment of a collar assembly of the invention.
Figure 8:
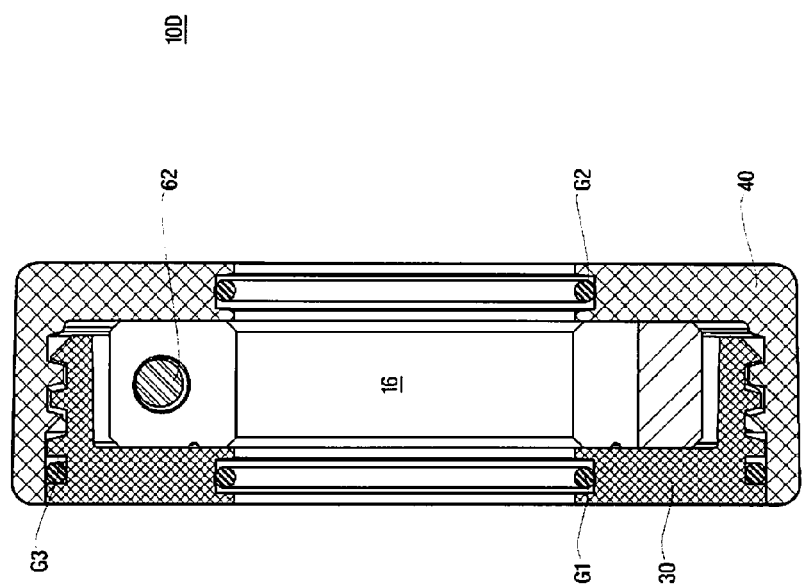
FIG. 8 shows a cross-section of the embodiment of FIG. 7.

Embodiment 10C and 10D differ from each other in that, for embodiment 10C of FIGS. 5 and 6, the peripheral boundary P1 extends radially to the outermost edge of the second cylindrical shell 44 of second shroud element 40, while for embodiment 10D of FIGS. 7 and 8, the peripheral boundary P1 extends radially only to the innermost surface of inner wall 46 of the second cylindrical shell 44 of second shroud element 40. As a consequence of this difference, with the embodiment 10D, the second shroud 40 can be screwed on to the outer wall 38 of first cylindrical shell 30, and even beyond, so that there exists no gap between face 20B of body member 16 and an inner surface of the second annular face member of second shroud element 40.

In various forms of the collar assembly of the invention, gaskets (such as silicone O-rings) can be deployed to enhance the seal of the shroud assembly enclosing the clamp.

In the illustrated forms of the collar assemblies 10A, 10B, 10C and 10D, a gasket G1 is disposed in a radially extending grove at the periphery of aperture 32 of the first shroud element 30, a gasket G2 is disposed in a radially extending grove at the periphery of aperture 42 of the first shroud element 40, and a gasket G3 is disposed at the junction of the first shroud element 30 and the second shroud element 40.

Figure 9:
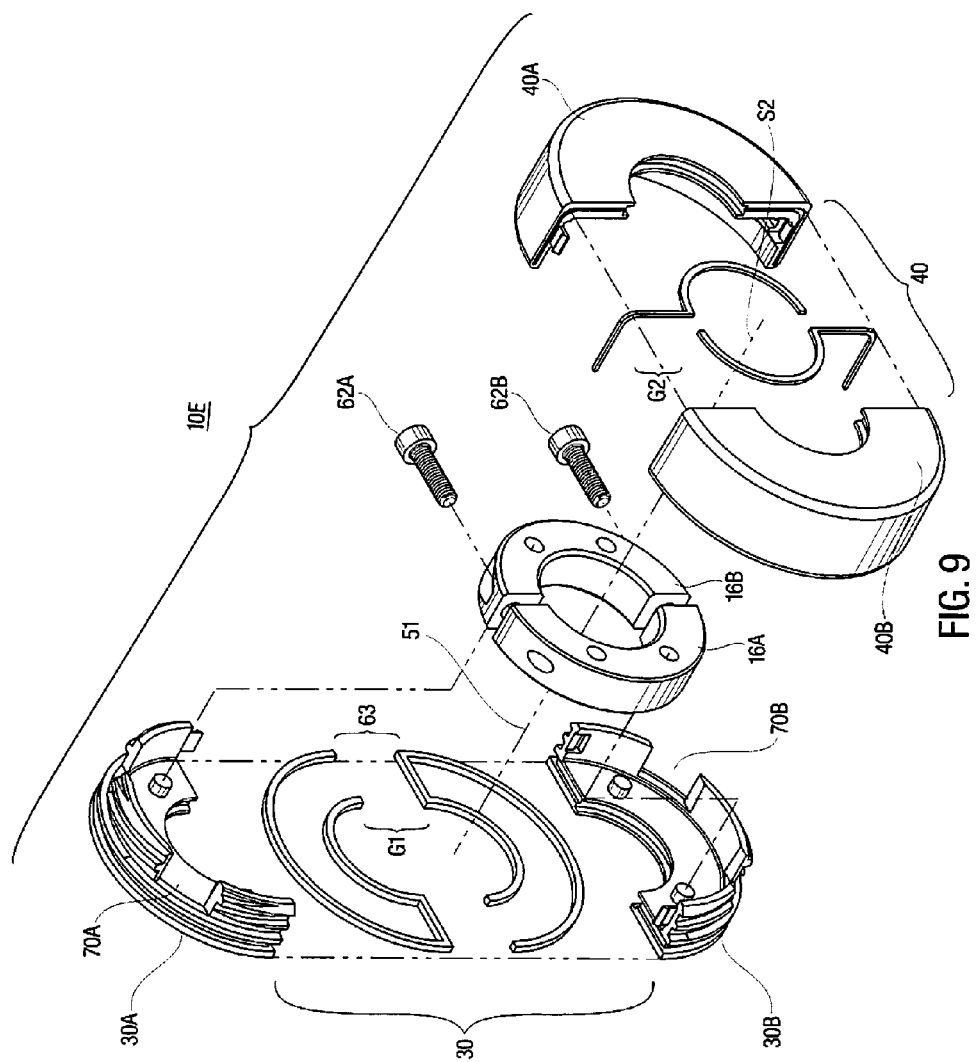
FIG. 9 shows an exploded view of a "split collar" embodiment of a collar assembly of the invention.
Figure 10:
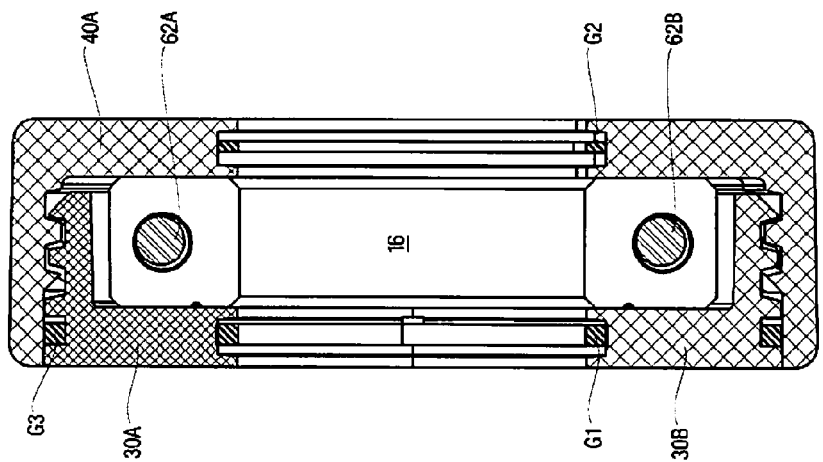
FIG. 10 shows a cross-section of the embodiment of FIG. 9.
Figure 11:
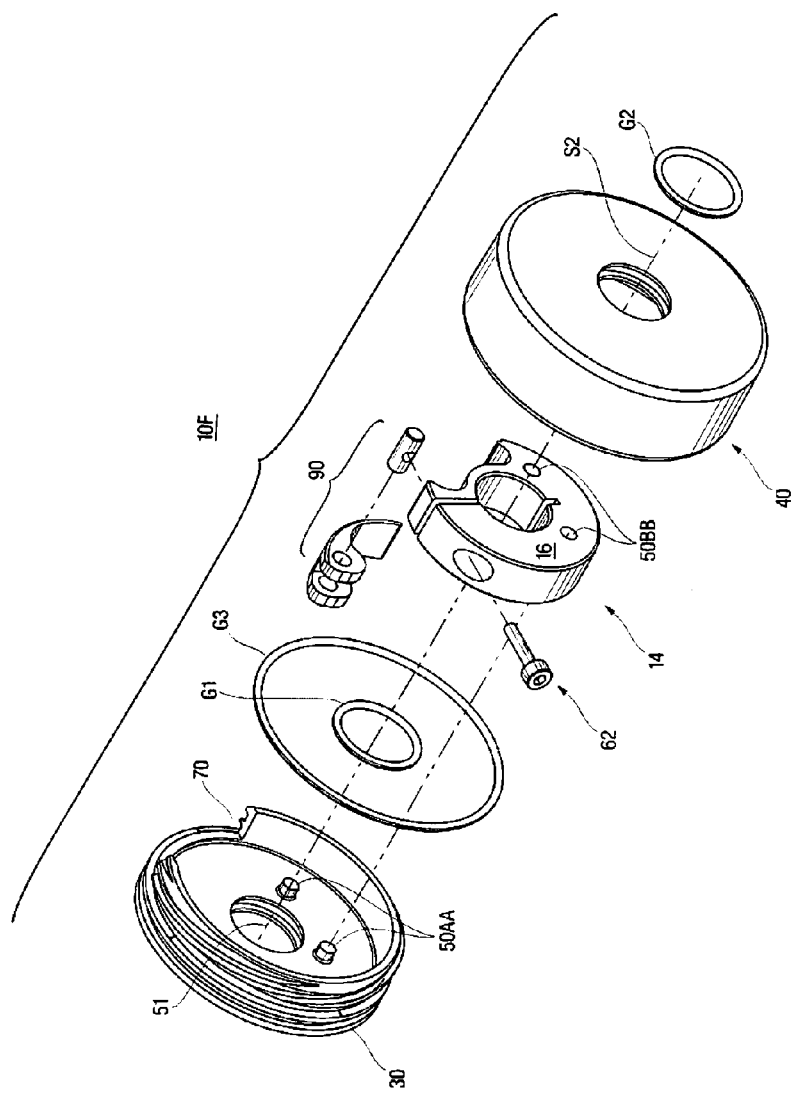
FIG. 11 shows an exploded view of a "cam-lock" embodiment of a collar assembly of the invention.
Figure 12:
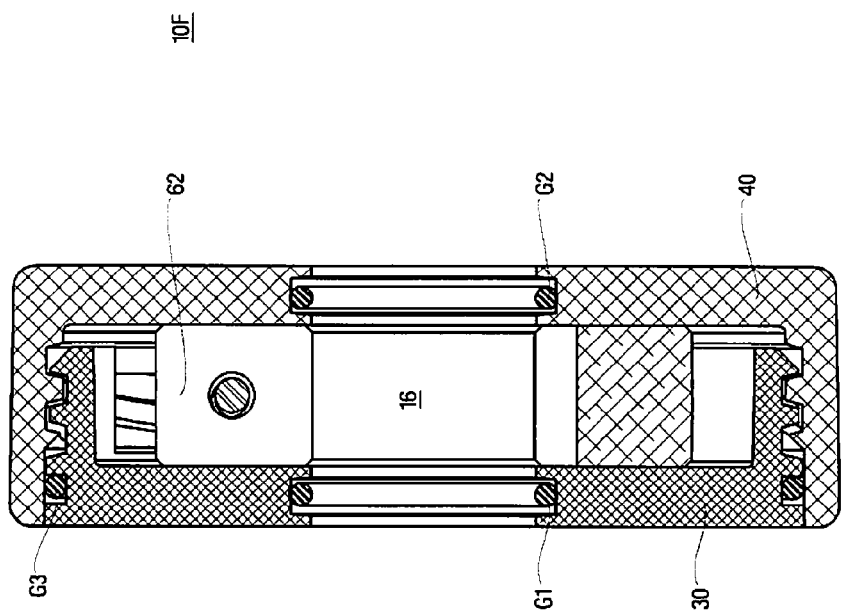
FIG. 12 shows a cross-section of the embodiment of FIG. 11.

The "split collar" embodiment 10E of FIGS. 9-10, and the "cam lock" embodiment 10F of FIGS. 11-12, are generally similar in form and function to the embodiment 10D of FIGS. 7-8. Embodiment 10E differs from embodiment 10D only in that the clamp collar 14 is a split collar, having a first C-shaped body member 16A and a second C-shaped body member 16B, and two screws 62A and 62B for joining the two sections 16A and 16B. There is no need for a flexure region, since the inner surface 20C of each of sections 16A and 16B have a radius R1. As one additional difference, there is a hole 70A in a first half cylindrical shell 30A and a hole 70B in a second half cylindrical shell 30B of first shroud element 30. As a further difference, second cylindrical shell 40 includes a first half cylindrical shell 40A and a second half cylindrical shell 40B. Further, the gaskets G1, G2 and G3 are shaped to accommodate the two-piece body member 16A, 16B.

Embodiment 10F of FIGS. 11-12, differs from embodiment 10D only in that the clamp collar 14 is a cam lock collar, and as a consequence, has a large aperture 70 in the first cylindrical shell to accommodate motion of the cam lever 90.

Figure 13:
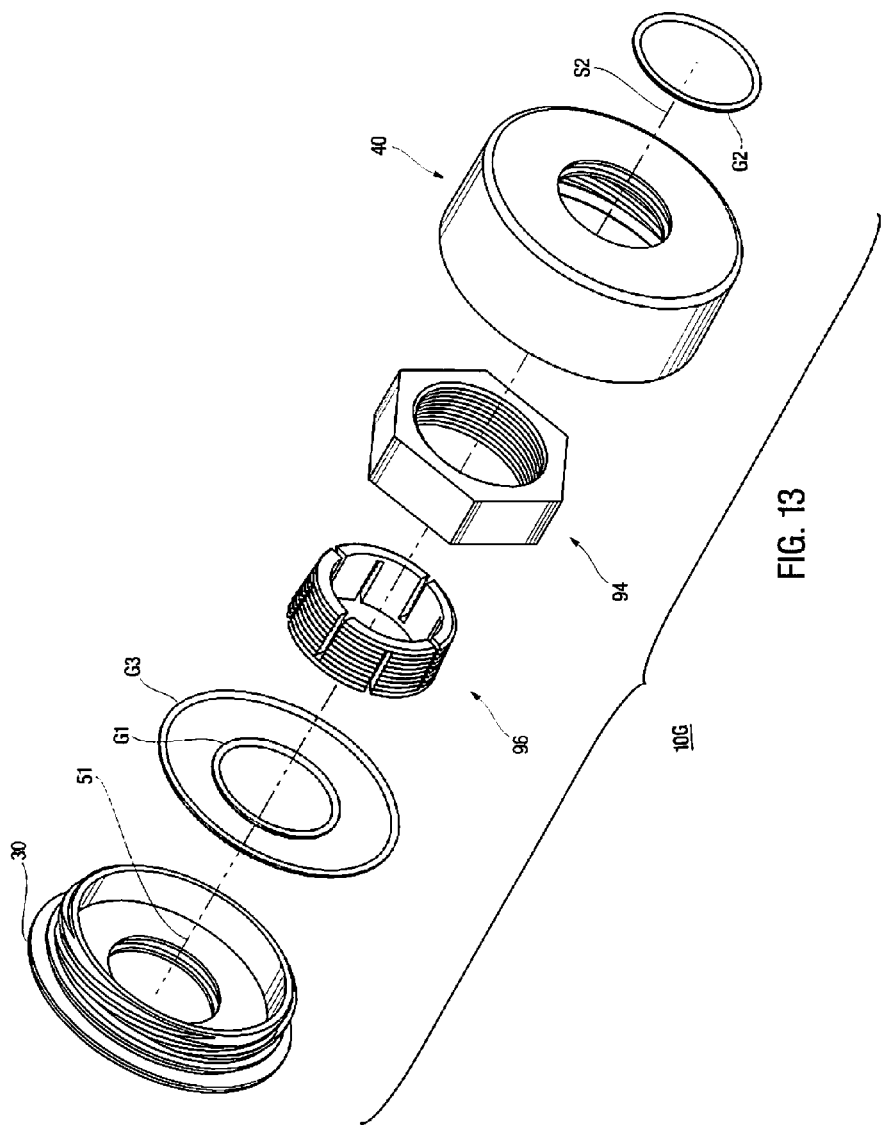
FIG. 13 shows an exploded view of a "taper lock" embodiment of a collar assembly of the invention.
Figure 14:
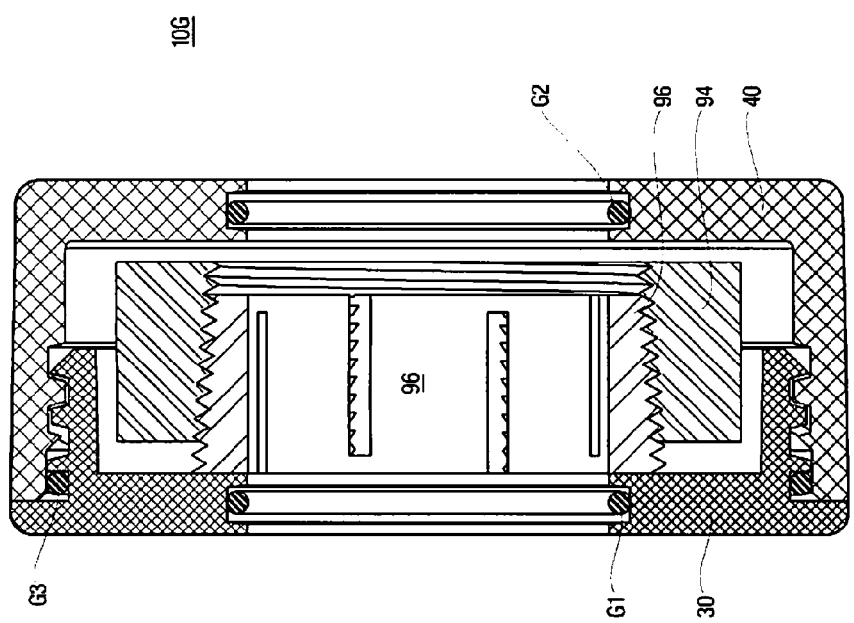
FIG. 14 shows a cross-section of the embodiment of FIG. 13.
Figure 15:
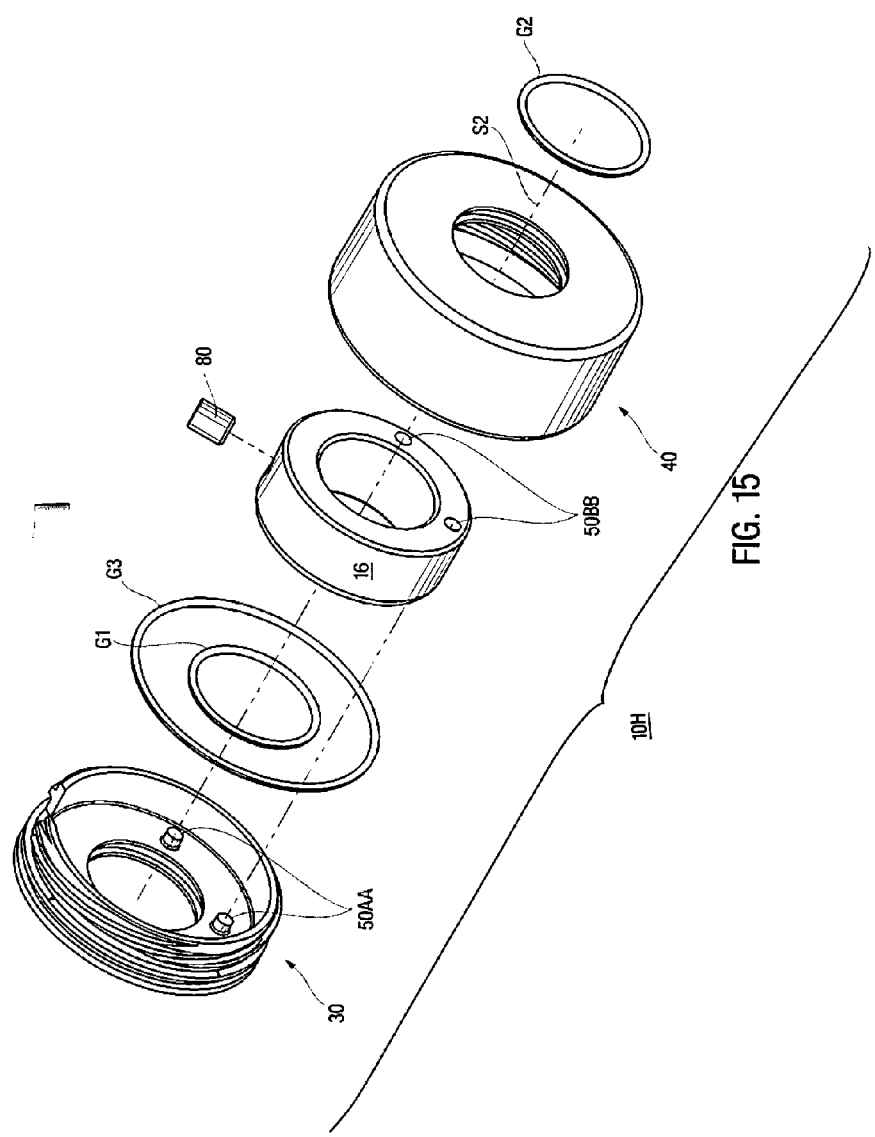
FIG. 15 shows an exploded view of a "set screw" embodiment of a collar assembly of the invention.
Figure 16:
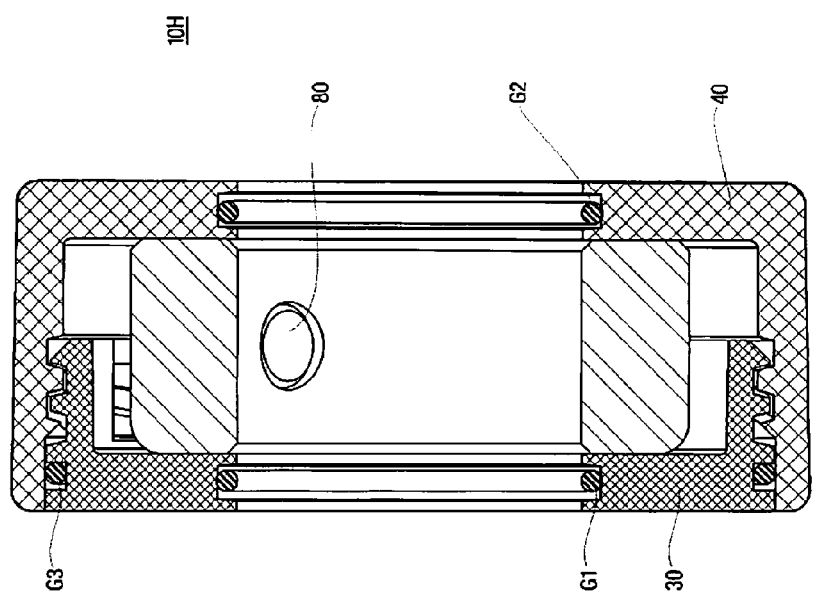
FIG. 16 shows a cross-section of the embodiment of FIG. 15.

The "taper lock" embodiment 10G of FIGS. 13-14, and the "set screw" embodiment 10H of FIGS. 15-16, are generally similar in form and function to the above described embodiment, except that a different form of clamp collar 14 is employed.

In embodiment, 10G of FIGS. 13-14, a "taper lock" clamp collar is employed, in which the clamping to a shaft is attained by rotating a nut 94 about a threaded tapered sleeve 96 (having axially extending slots). The first shroud element 30 and second shroud element 40 and gaskets G1, G2 and G3 are similar in function to those described above, for example, with respect to embodiment 10A.

In embodiment 10H of FIGS. 15-16, a "set screw" clamp collar is employed, in which the clamping to a shaft is attained by rotating a radial directed set screw 80 so that it engages the shaft. The first shroud element 30 and second shroud element 40 and gaskets G1, G2 and G3 are similar in form and function to those described above, for example, with respect to embodiment 10A.

Embodiments 10I, 19J and 10K, as shown in FIGS. 17-18, 19-20 and 21-22, respectively, are directed to shaft couplings. Each of embodiments 10I, 10J and 10K include shaft clamp collar-like structures 102B, 102B at each end. The shaft clamp collar-like structures 102A, 102B are rigidly connected and each is adapted for affixation to a separate shaft. For embodiments 10I and 10J, a first shroud element 30 and second shroud element 40 and gaskets G1, G2 and G3 are similar in form and function to those described above, for example, with respect to embodiment 10A. In the embodiment 10K, the shroud is structured in a difference manner, including an internally threaded cylindrical shell 120, to which first and second shroud elements 30A and 30B are connected at the opposite ends of the cylindrical shell 120.).

The first shroud element 30 and second shroud element 30A and gaskets G1, G2, G3A and G3B are similar in form and function to those described above, for example, with respect to embodiment 10A.

The above-described embodiments are exemplary for a shaft collar/coupling assembly adapted for use in the food-processing and similar industries. The assembly includes a metallic shaft collar disposed within an associated shroud. The shroud provides a cover overlying the collar, eliminating exposed features of the collar that can trap food particles and make maintaining a proper level of cleanliness of food-processing equipment, a time-intensive, costly process, while retaining many of the advantages of a standard metallic collar.

A primary application for the invention in the food service industry or others where machines are frequently subjected to washdowns and/or corrosive chemicals. The invention also useful in other environments where comparable protection is needed in association with rigid coupling to a shaft.

Secondary applications include uses in which safety is a concern, as the collar/coupling assembly (with its collar/coupling and shroud) eliminates all sharp edges on and enclosed collar, which could catch clothing or cut skin, especially when used in an application where high speed is employed. The collar/coupling assembly is also applicable to equipment where aesthetics are important, providing a seamless appearance on otherwise exposed mechanisms or artistic projects.

The collar/coupling assembly also can enable the use of a carbon steel collar in applications requiring extreme holding strength, compared to that offered by a stainless steel collar, but where an exposed carbon steel collar would be degraded by environmental conditions.

The collar/coupling assembly is the first known to specifically address the needs of the food-processing industry by eliminating difficult-to-clean external features while using only materials that are approved for food service. In a preferred form, a two-piece threaded shroud assembly allows access to a metallic collar's clamp screw for easy installation and adjustment while disassembled, but completely encapsulates the metallic collar when assembled.

A rigid connection between the metallic collar/coupling and polymer shroud ensures that the shroud is held concentric and perpendicular to the shaft while allowing the two halves of the shroud to be joined while maintaining a completely smooth exterior.

The use of a miniaturized metallic collar/coupling permits the shrouded assembly to be only slightly larger than a standard collar/coupling for a given shaft size.

For use with a two-piece split collar or rigid coupling, both sides of the shroud can be created from two halves, which join together around the shaft (via snaps, slides, screws, etc) to form a water-tight seal. Thus, the entire assembly can be removed from the middle of a shaft, without needing to have access to either end—one of the key advantages to using a two-piece collar/coupling.

The foregoing detailed description has been provided for a better understanding of the invention only, and some modifications will be apparent to those skilled in the art, without deviating from the spirit and scope of the appended claims.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A collar assembly for coupling to a shaft having radius R1, comprising:
   (A) a clamp including:
      (i) a C-shaped body member disposed about a central axis C along a first distance D1, and extending in a circumferential direction, the body member having
         (a) a substantially planar first collar end surface opposite a substantially planar second collar end surface, the first and second collar end surfaces separated by a gap G and substantially parallel,
         (b) a flexure region such that the first and second collar end surfaces are resilient in motion in a circumferential direction with respect to the central axis C and stiff in motion in other directions,
         (c) first and second planar C-shaped face surfaces at opposite ends of the body member and extending about and perpendicular to the central axis C,
         (d) a cylindrical inner surface having a first radius and extending the first distance D1, and
         (e) a cylindrical outer surface having a second radius and extending the first distance D1, the second radius greater than the first radius,
      (ii) a clamp assembly coupling the first collar end surface to the second collar end surface such that the gap G is adjustable, wherein the first and second radiuses vary with respect to the central axis C based upon gap G,
   (B) a shroud assembly including:
      (i) a first shroud element having
         (a) a first annular face member disposed about a first shroud axis S1, and defining a circular aperture disposed about the first shroud axis S1 and having a radius greater than or equal to R1, and having a circular first peripheral boundary P1 having a radius greater than or equal to R2,
         (b) a first cylindrical shell extending from the first peripheral boundary P1 of an inward facing surface of the first annular face member and having an inner wall and an outer wall extending a distance D2 in the direction of the first shroud axis S1, where D2 is greater than or equal to D1, and
         wherein the outer wall bears a helical thread pattern T1, and
         wherein the inner wall is complementary in shape to the cylindrical outer surface of the body member, and
      (ii) a second shroud element having:
         (a) a second annular face member disposed about a second shroud axis S2, and defining a circular aperture disposed about the second shroud axis S2 and having a radius greater than or equal to R1, and having a circular second peripheral boundary P2 having a radius greater than or equal to R2,
         (b) a second cylindrical shell extending from the second peripheral boundary P2 of an inward facing surface of the second annular face member and having an inner wall and an outer wall extending a distance D3 in the direction of the second shroud axis S2, wherein the inner wall bears a helical thread pattern T2, where T2 is complementary to T1, and
   (C) a coupling assembly adapted to captively couple the body member to the first shroud element and within the first cylindrical shell of the first shroud element, whereby the first face of the body member is adjacent to the inner surface of the first annular face member of the first shroud element.

2. A collar assembly according to claim 1, wherein the clamp assembly includes:
(A) an elongated first through-hole in the first end portion of the body member, wherein the first through-hole is cylindrical, having a radius RA, and extends along a through-axis TA transverse to central axis C, and wherein the first through-hole bears a thread pattern T01,
(B) an elongated second through-hole in the second end portion of the body member, wherein the second through-hole is cylindrical, having a radius RB greater than a maximum radius of the thread pattern T01, and extends along the through-axis TA,
(C) a screw having a shoulder and an outer cylindrical surface extending therefrom, and
  (i) wherein the cylindrical surface has a radius RA, and bears a thread pattern T02, where thread pattern T02 is complementary to thread pattern T01,
  (ii) wherein the shoulder has a radial dimension greater than RT, and
  (iii) wherein the cylindrical surface of the screw is rotationally positionable within the first through-hole and second through-hole, thereby engaging thread pattern T01 of the first through-hole with the thread pattern T02 of the cylindrical surface of the screw, and
  (iv) wherein when the screw, when the thread pattern T02 of the cylindrical surface of the screw is engaged with the thread pattern T01 of the first and second throughholes,
    (a) is rotated in a first direction, relative motion is effected whereby the first end face and the second end face of the body member move toward each other thereby reducing gap G, and
    (b) is rotated in a second direction opposite the first direction, relative motion is effected whereby the first end face and the second end face of the body member move away from each other, thereby increasing the gap G.

3. A collar assembly according to claim 2, wherein the first cylindrical shell of the first shroud element includes an aperture extending therethrough, wherein the aperture extends along and about the through axis TA.

4. A collar assembly according to claim 1, wherein the coupling assembly includes:
a metallic sheet split hub affixed to the first shroud element, wherein the split hub includes m hub elements,
wherein each hub element has a first cylindrical shell section extending a distance D in the direction of, and less than 180° about, the axis S1 from a first end to a second end, and having a radius R1 with respect to the axis S1, and including at the first end thereof, a first flange extending radially therefrom with respect to axis S1, wherein the first flange is fixedly attached to an inner surface of the first annular face member whereby axis S1 is coaxial with the central axis C.

5. A collar assembly according to claim 4, wherein m=2, and wherein the split hub includes:
(i) a first hub element having a first cylindrical shell section extending a distance D1 in the direction of, and less than 180° about, the axis S1 from a first end to a second end, and having a radius R1 with respect to the axis S1, and including at the first end thereof, a first flange extending radially therefrom with respect to axis S1, wherein the first flange is fixedly attached to an inner surface of the first annular face member whereby axis S1 is coaxial with the central axis C,
(ii) a second hub element having a second cylindrical shell section extending a distance D1 in the direction of, and less than 180° about, the axis S1 from a first end to a second end, and having a radius R1 with respect to the axis S1, and having a radius R1 with respect to the axis S1, and including at the first end thereof, a second flange extending radially therefrom with respect to axis S1, wherein the second flange is fixedly attached to an inner surface of the first annular face member whereby axis S1 is coaxial with the central axis C.

6. A collar assembly according to claim 1, wherein the coupling assembly includes:
(A) n elongated extension members, each extension member extending with a monotonically decreasing cross-section, a distance H from the inward facing surface of the first annular face member along respective associated axes parallel to the central axis C, to a distal tip thereof, where n is greater than 1, wherein the respective axes of the extension members are in a predetermined pattern P transverse to the central axis C,
(B) n elongated apertures extending with a monotonically decreasing cross-section, into and through the body member from the first face surface, each of the apertures being adapted to receive a correspondingly positioned one of the extension members, wherein at least one of the distal tips of the elongated extension members is deformable to establish a capture portion having a cross-section transverse to the direction of the central axis C having a greater transverse to the central axis C than a cross-section of its associated aperture at the second face surface of the body member.

7. A collar assembly according to claim 1, wherein the body member is metallic and the first shroud element and the second shroud element are a synthetic material.

8. A collar assembly according to claim 7, wherein the synthetic material is a plastic.

9. A collar assembly for coupling to a shaft extending along and disposed about a shaft axis and characterized by a predetermined radius R1, comprising:
(A) a C-shaped clamp collar extending along and disposed about a central axis, and adapted for selective fixture to the shaft with the central axis concentric with the shaft axis, wherein the clamp collar is selectively adjustable to have an inner radius with respect to the clamp axis between R1 and a value greater than R1,
(B) a shroud assembly including:
  (i) an annular first shroud element disposed about a first shroud axis, and having a first outer peripheral boundary and a first central aperture, wherein the first central aperture has a radius greater than R1, and
  (ii) an annular second shroud element disposed about a second shroud axis, and having a second outer peripheral boundary, and a second central aperture, wherein the second central aperture has a radius greater than R1, and
(C) a capture assembly captively coupling the clamp collar to the first annular shroud element whereby the collar axis is coaxial with the first shroud axis,
wherein the first shroud element and the second shroud element are adapted to be selectively joined at or near their respective outer peripheral boundaries to establish an interior volume adapted to fully enclose the clamp collar whereby the central axis, the first shroud axis and the second shroud axis are coaxial.

10. A collar assembly according to claim 9, wherein the clamp collar is made of a relatively non-compliant metal, and the first shroud element and the second shroud element are made of a relatively compliant synthetic material.

11. A collar/coupler assembly for being secured to a shaft having characterized by a predetermined radius R1, where the shaft extends along and is disposed about a shaft axis S, comprising:
  (A) an annular collar/coupling extending along and disposed about a central axis, and adapted for selective fixture to the shaft with the central axis coaxial with the shaft axis, wherein the collar/coupler is selectively adjustable to have an inner radius R with respect to the central axis where R≥R1,
  (B) a shroud assembly including:
    (i) an annular first shroud element disposed about a first shroud axis, and having a first outer peripheral boundary and a first central aperture, wherein the first central aperture has a radius greater than R1, and
    (ii) an annular second shroud element disposed about a second shroud axis, and having a second outer peripheral boundary, and a second central aperture, wherein the second central aperture has a radius greater than R1, and
    (iii) a capture assembly for captively coupling the collar/coupling to the first annular shroud element whereby the collar/coupling axis is coaxial with the first shroud axis, wherein the first shroud element and the second shroud element are adapted to be selectively joined at or near their respective outer peripheral boundaries to establish an interior volume adapted to fully enclose the collar/coupling whereby the central axis, the first shroud axis and the second shroud axis are coaxial.

12. A collar/coupling assembly according to claim 11, wherein the collar/coupling is made of a relatively non-compliant metal, and the first shroud element and the second shroud element are made of a relatively compliant synthetic material.

13. A collar/coupler assembly according to claim 11, wherein the annular collar/coupling is a C-shaped clamp collar.

14. A collar/coupler assembly according to claim 11, wherein the annular collar/coupling is a split clamp collar.

15. A collar/coupler assembly according to claim 11, wherein the annular collar/coupling is a cam-lock shaft collar.

16. A collar/coupler assembly according to claim 11, wherein the annular collar/coupling is a taper lock shaft collar.

17. A collar/coupler assembly according to claim 11, wherein the annular collar/coupling is a set screw shaft collar.

18. A collar/coupler assembly according to claim 11, wherein the annular collar/coupling is a shaft coupling.

19. A collar/coupler assembly according to claim 18, wherein the shaft coupling is a rigid shaft coupling.

* * * * *